United States Patent [19]

Beim

[11] Patent Number: 4,532,827
[45] Date of Patent: Aug. 6, 1985

[54] DUAL POWER TRANSMISSION FOR TRACTOR VEHICLES

[75] Inventor: Rudolf Beim, Southfield, Mich.

[73] Assignee: Ford Motor Company, Dearborn, Mich.

[21] Appl. No.: 534,224

[22] Filed: Sep. 21, 1983

[51] Int. Cl.³ .................. F16H 3/02; F16H 57/10
[52] U.S. Cl. .................... 74/745; 74/411.5; 192/18 A; 192/12 C
[58] Field of Search ............. 74/411.5, 745; 192/12 C, 12 D, 13 A, 18 A, 18 B

[56] References Cited

U.S. PATENT DOCUMENTS

| | | | |
|---|---|---|---|
| 1,229,984 | 6/1917 | Libby | 192/18 B |
| 1,418,325 | 6/1922 | Patterson | 192/18 B |
| 1,628,606 | 5/1927 | Kuehnel | 192/12 D |
| 2,883,021 | 4/1959 | Hill | 192/18 A |
| 3,117,469 | 1/1964 | Feaster et al. | 192/18 B |
| 3,173,525 | 3/1965 | Hergert | 192/18 B |
| 3,293,933 | 12/1966 | Foxwell | 74/360 |
| 3,542,176 | 11/1970 | Foxwell et al. | 192/351 |
| 3,886,815 | 6/1975 | Eastwood | 74/745 |
| 3,954,028 | 5/1976 | Windish | 74/792 |

FOREIGN PATENT DOCUMENTS

| | | | |
|---|---|---|---|
| 3013382 | 10/1981 | Fed. Rep. of Germany | 192/12 C |
| 0070266 | 6/1977 | Japan | 192/12 D |
| 545165 | 5/1942 | United Kingdom | 192/18 A |

Primary Examiner—George H. Krizmanich
Assistant Examiner—Dirk Wright
Attorney, Agent, or Firm—Donald J. Harrington; Keith L. Zerschling

[57] ABSTRACT

A tractor transmission having multiple ratios and dual power gearing arrangement located between an engine and multiple ratio gearing whereby the auxiliary gearing effects two multiple ratio drive ranges and wherein shifting from one range to the other in the auxiliary gearing can be accomplished smoothly and wherein the rotary components of the auxiliary gear unit are characterized by low inertia and low power loss.

4 Claims, 6 Drawing Figures

DUAL POWER TRANSMISSION FOR TRACTOR VEHICLES

GENERAL DESCRIPTION OF THE INVENTION

My invention relates to tractor drivelines. It may be adapted, for example, for use in agricultural tractors to provide two ranges of torque multiplication as driving torque is delivered from the tractor engine to the traction wheels.

Examples of tractor drivelines that can be adapted to accommodate the improvements of my invention are shown in U.S. Pat. Nos. 3,293,933 and 3,542,176, which are assigned to the assignee of my invention. U.S. Pat. No. 3,886,815, assigned to David Brown Tractors, Limited, discloses a tractor driveline having auxiliary gears between the engine and the multiple ratio gearing to effect a forward drive range and a reverse drive range and wherein provision is made for synchronizing the ratio change from the forward drive mode to the reverse drive mode.

The improved gearing arrangement of my invention includes an auxiliary dual power gearing unit located between the engine and the multiple ratio gearing in a way that resembles the gearing arrangement of the forward and reverse drive gearing of U.S. Pat. No. 3,886,815. I am aware of various gearing systems that may be used to provide double range drivelines in tractor transmissions. They can be arranged in the manner suggested by U.S. Pat. No. 3,886,815. One such auxiliary gearing arrangement is shown in U.S. Pat. No. 3,954,028, assigned to Caterpillar Tractor Co.

The improved transmission mechanism of my invention is distinguishable from the prior art as represented, for example, by the reference patents mentioned in the preceding paragraphs because it has a simplified actuator system that permits the vehicle operator to change the drive range by a single actuator with a maximum degree of smoothness. It is capable, furthermore, of providing ratio changes with minimum inertia forces and with a minimum drag of the friction elements. It is capable also of providing a tow-start capability which permits the traction wheels to drive the engine through the transmission and the auxiliary gearing without the need for actuating fluid pressure. Changes in drive range can be made, furthermore, while the vehicle is in motion.

My improved auxiliary drive gearing includes an annular piston and cylinder design wherein an underdrive piston is actuated under hydraulic pressure without the need for rotary ring seals which further reduces the possibility of seal ring wear and undesirable durability problems that result from seal wear. My design is characterized by a single piston and clutch pack assembly that is hydraulically actuated. This is in contrast to the gearing arrangement of previously discussed reference U.S. Pat. No. 3,954,028 where separate fluid pressure operated servos for the clutch and the brake of the auxiliary gearing are required.

PARTICULAR DESCRIPTION OF THE INVENTION

Figure 1:
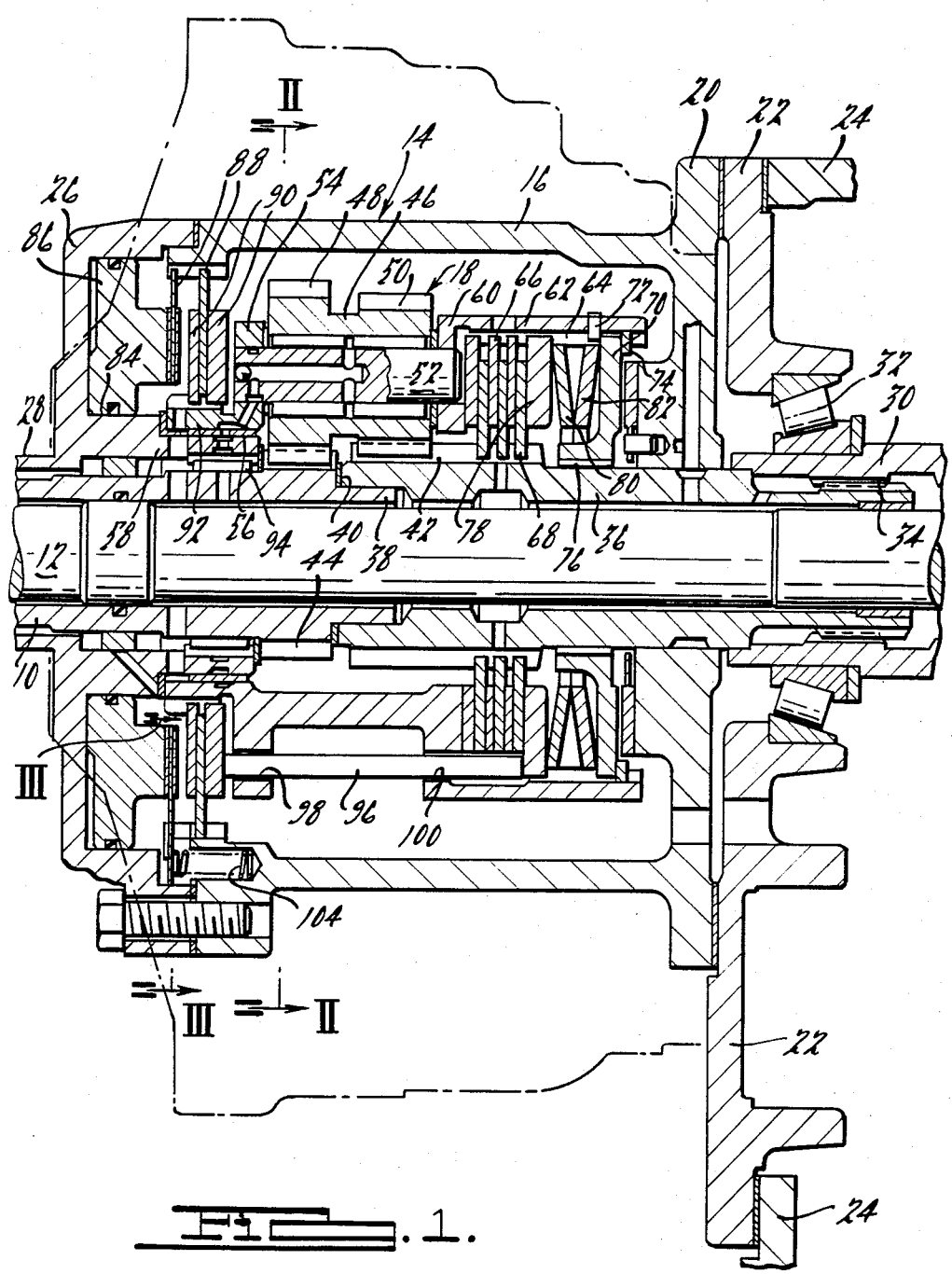
FIG. 1 is a cross-sectional assembly view of a dual-power, auxiliary gearing unit for use in a tractor driveline and that embodies the improvements of my invention.
Figure 2:
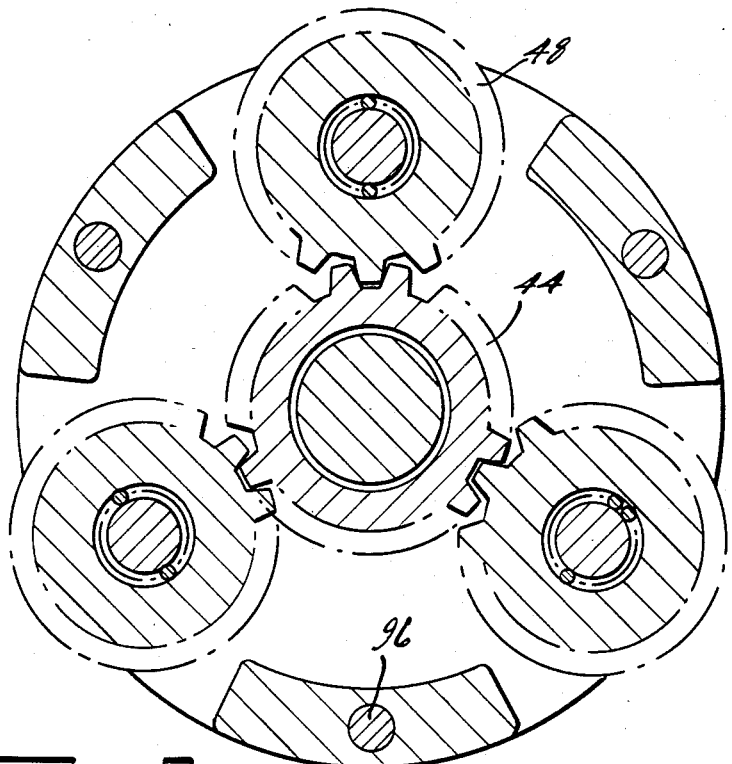
FIG. 2 is a cross-sectional view taken along the plane of section line 2—2 of FIG. 1.
Figure 2A:
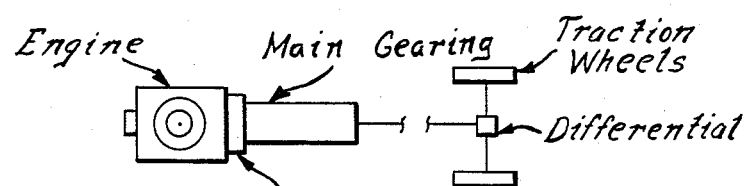
FIG. 2A shows in schematic form a vehicle driveline that includes the gear assembly of my invention.

In FIG. 1 numeral 10 designates a torque input sleeve shaft that is connected to the crankshaft of an internal combustion engine. Numeral 12 designates a power take off shaft that also is connected to the engine crankshaft. The power take off shaft 12 extends through the sleeve shaft in co-axial disposition with respect to a dual power auxiliary gear unit 14. Shaft 12 extends concentrically through the multiple ratio gearing, not shown.

A transmission case 16 for the auxiliary gearing encloses epicyclic gearing 18. It is connected at its right end 20 to the end plate 22 for multiple ratio gearing case 24. The case 16 has a forward mounting plate 26 that is formed with a central sleeve shaft 28 to permit mounting of a selectively engageable driver controlled clutch of the kind shown, for example, in Foxwell U.S. Pat. No. 3,542,176, which is assigned to the assignee of my invention.

The torque input shaft for the multiple ratio transmission gearing is a sleeve shaft 30 which is journalled by bearings 32 in the forward end plate 22. Sleeve shaft 30 is connected by splines 34 to intermediate sleeve shaft 36, the left-hand end of which is piloted on a reduced diameter portion 38 of the torque input shaft 10. A thrust bearing 40 is disposed between the left end of the sleeve shaft 36 and a shoulder formed on the right end of the sleeve shaft 10.

The left end of sleeve shaft 36 is formed with sun gear teeth 42, and the right end of input shaft 10 is formed with sun gear teeth 44. Sun gear teeth 44 have a pitch diameter that is less than the pitch diameter of the sun gear teeth 42.

Compound planet pinions 46 are formed with a large diameter pinion portion 48 and a small diameter pinion portion 50. Compound planet pinion 46 and the sun gears 44 and 42 constitute the gear elements for the epicyclic gearing 18.

Pinions 46 are journalled on pinion shafts 52. The left ends of the pinion shafts 52 are supported in shaft openings formed in carrier end wall 54, which is journalled by means of bushing 56 on stationary sleeve 58 that forms a part of the forward wall 26 of the casing 16. The right end of each shaft 52 is supported in a shaft opening formed in carrier end wall 60. A clutch drum 62 is connected to, or formed integrally with, the end wall 60 of the carrier. Drum 62 is formed with internal splines 64 which carry externally splined clutch discs 66. These are arranged in interdigital relationship with respect to internally splined clutch discs 68 that are splined to the teeth 42.

Clutch support plate 70 is splined to the internal spline teeth of the drum 62 and is held axially fast by pin 72 and snap ring 74. End plate 70 is journalled by bushing 76 on the shaft 36.

A clutch pressure plate 78 is externally splined to the internal spline teeth 64 and is engaged by a Belleville spring element 80 located between the plate 70 and the plate 78. Belleville spring 80 is located directly adjacent a companion Belleville spring element 82, the innermost margins of the spring elements being in engagement when they are assembled as shown. An axial force is developed on the pressure plate 78 which causes the clutch discs 66 and 68 to become frictionally engaged.

The impeller 26 of the casing 16 defines an annular cylinder 84 which receives an annular piston 86. Externally splined brake discs 88 are carried by internally splined portion of the casing 16. They register with internally splined brake discs 90 which are connected to externally splined extension 92 of the carrier end plate 54. Portion 92 is supported on stationary casing extension 58 as mentioned previously. Casing extension 58 also forms a bearing support for bearing 94 which journals shaft 10.

Figure 3:
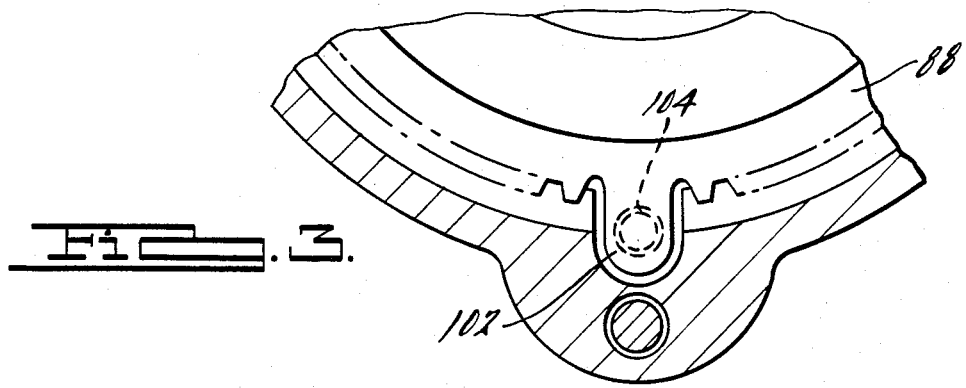
FIG. 3 is a partial cross-sectional view showing a portion of the friction brake illustrated in the left side of the cross-sectional view of FIG. 1 and is taken along the plane of section line 3—3 of FIG. 1.

Cylinder 84 and piston 86 cooperate to define an annular working chamber for brake pressure. When that working chamber is pressurized, the carrier 54 becomes braked to the casing 16. Pinion portion 48 meshes with sun gear 44 and pinion portion 50 meshes with sun gear 42. The carrier for the epicyclic gearing 18 supports three angularly spaced actuator rods 96. The left end of each rod 96 is slidably received in opening 98 in the carrier wall 54 and the right end is slidably supported in opening 100 formed in the carrier wall 60. Actuator rods 96 engage at their right ends pressure plate 78, and they engage at their left ends the adjacent brake disc 90 which serves as a pressure plate. The brake disc 88 adjacent the piston 86, as seen in FIG. 3, has a radially extending tang 102, preferably at more than one location, and these are urged in a left hand direction by piston return springs 104 received in spring openings formed in the casing 16.

When the working chamber behind the piston 86 is pressurized, brake discs 88 and 90 become frictionally engaged thereby anchoring the carrier 54. This causes the actuator rods 96 to compress the Belleville springs 82 thereby releasing the multiple disc clutch shown at 66 and 68 and permitting the sleeve shaft 36 to rotate relative to shaft 10. When fluid pressure is released from the working pressure chamber behind the piston 86, Belleville springs 80 and 82 engage the clutch discs 66 and 68 thereby locking the carrier for the epicyclic gearing to the sun gear 42, thus establishing a direct driving connection between shaft 36 and the shaft 10. Actuator rods 96 are urged under these conditions in a left hand direction, and the springs 102 return the piston to the position shown in FIG. 1. Thus the brake is released and the clutch is applied under the influence of the Belleville spring force.

Figure 4A:
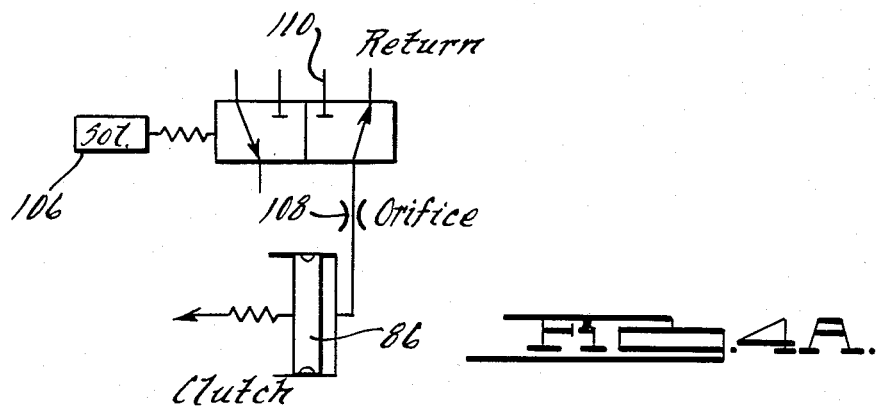
FIG. 4A shows a schematic valve arrangement for actuating the clutch and brake of the structure shown in FIG. 1.

FIG. 4A shows a diagramatic sketch of an appropriate valving arrangement for actuating the clutch and the brake. In the schematic representation of FIG. 4A the valve is operated by an electric solenoid 106. If the valve assumes the position shown in FIG. 4A, the working pressure chamber behind the piston 86 is exhausted to the return line through an orifice 108. The supply passage 110 for the working pressure chamber is blocked. If the solenoid actuates the value to the other position indicated in FIG. 4A, supply passage 110 becomes connected to the working pressure chamber for the piston 86 through the orifice 108.

Figure 4B:
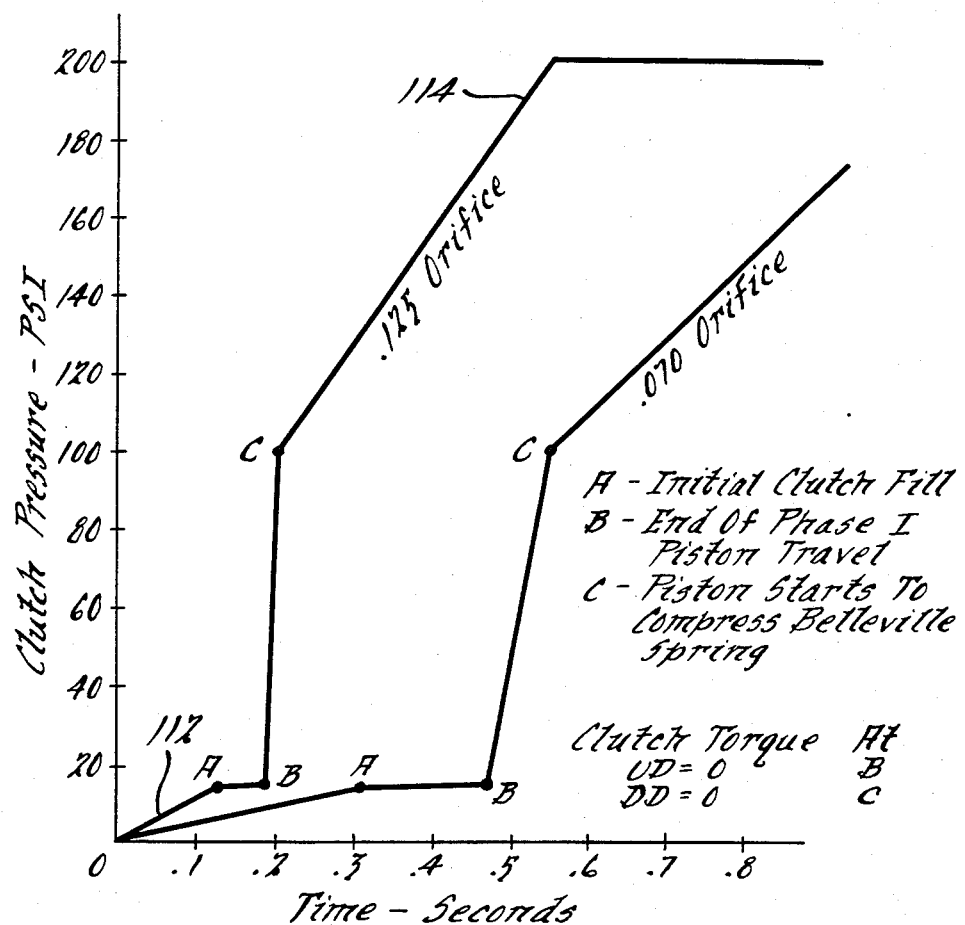
FIG. 4B shows the relationship between clutch pressure and engaging time for the fluid pressure actuator for the clutch and brake of the embodiment of FIG. 1.

The graph shown in FIG. 4B illustrates the relationship between engagement time and brake pressure. At the inception of the ratio change the pressure behind the piston rises as indicated by the line 112 until it reaches point A, at which time the working pressure chamber is filled and the piston 86 is stroked against the force of spring 104. At point B the Belleville spring becomes initially compressed, the line extending between point B and point C represents the travel that occurs in the system as the Belleville spring becomes preloaded. At point C the Belleville spring becomes compressed and the clutch pressure builds in accordance with the linear relationship shown in FIG. 4B at 114.

If the orifice size is changed, the rate of pressure buildup can be changed. In FIG. 4B, the left hand plot shows the relationship for a large diameter orifice and the right hand plot shows the relationship for a smaller orifice in the circuit at 108.

It can be seen that only a single piston and underdrive brake disc assembly is required to achieve an underdrive condition in the auxiliary gearing. No relative rotation of the piston is required to achieve the underdrive condition. Thus no rotary seals are required and there is no resulting seal ring wear. If the vehicle is stationary with the engine disabled, under which condition pressure would not be available to the auxiliary drive, it is possible to tow-start the track because the clutch will be applied under the influence of the Belleville springs to establish a direct driving condition through the auxiliary gearing.

The epicyclic gearing of the auxiliary unit lacks a ring gear and thus the overall radial dimensions of the gear unit can be reduced. This reduces the inertia as well as the cost of manufacture. The strategic location of the direct drive clutch radially inward of the carrier extension also reduces the rotating inertia which results in improved durability of the driveline without adversely effecting the clutch capacity. It is possible in this arrangement to shift smoothly from one ratio to the other without the need for mechanical synchronizer assemblies that would add substantially to the manufacturing cost.

The return spring 104 reduces the drag on the brake discs in direct drive operation. Any residual pressure in the working chamber will not cause a residual drag on the brake discs because the brake discs are rendered inactive by the return springs.

Having thus described a preferred embodiment of my invention, what I claim and desire to secure by U.S. Letters Patent is:

1. In a dual power tractor driveline for delivering torque from an engine to traction wheels comprising a multiple ratio torque transmitting gear assembly and an auxiliary gear assembly located between the multiple ratio gear assembly and the engine, the auxiliary gear assembly comprising:

a first input shaft adapted to be connected to the engine, a first sun gear formed on said input shaft, an intermediate shaft disposed coaxially with respect to said input shaft;

a second input shaft for said multiple ratio gear assembly connected to one end of said intermediate shaft, a second sun gear formed on said intermediate shaft, compound planet pinions connected together for joint rotation and having two pinion portions of unequal pitch diameter, one pinion portion engaging the sun gear on said first input shaft and the other pinion portion engaging the sun gear on said intermediate shaft, a carrier rotatably supporting said pinions;

a casing surrounding said sun gear and pinions, a fluid pressure operated brake actuator in said casing on one end of said carrier, brake discs carried by said casing and by said carrier adjacent said brake actuator, a clutch drum connected to said carrier on the side of said carrier opposite said brake actuator, clutch discs carrier by said clutch drum and by said intermediate shaft, spring means within said clutch drum for engaging said clutch discs to establish normally a 1:1 driving ratio between said input shaft and said intermediate shaft;

actuator rods supported slidably by said carrier and extending from said clutch discs to said brake discs whereby said clutch discs are moved out of clutching engagement against the opposing force of said spring means when clutch pressure is applied to the said brake actuator.

2. The combination as set forth in claim 1 wherein:

the sun gear formed on said first input shaft is of smaller pitch diameter than the sun gear formed on said intermediate shaft whereby an underdrive ratio is established between said multiple ratio gear assembly and said first input shaft when said brake discs are frictionally engaged by said brake actuator;

said carrier acting as a reaction member during underdrive operation thus establishing a higher range of ratios available in said driveline when said brake actuator is applied and a lower range of ratios in said driveline when said brake actuator is inactive.

3. The combination as set forth in claim 1 wherein said spring means comprises a pair of Belleville springs, one margin of one spring engaging a clutch disc, one margin of the adjacent spring engaging said clutch drum and the other margins of said springs engaging each other whereby a predetermined axial clutch applying force is applied to said clutch discs when said brake actuator is inactive.

4. The combination as set forth in claim 2 wherein said spring means comprises a pair of Belleville springs, one margin of one spring engaging a clutch disc, one margin of the adjacent spring engaging said clutch drum and the other margins of said spring engaging each other whereby a predetermined axial clutch applying force is applied to said clutch discs when said brake actuator is inactive.

* * * * *